United States Patent
Montvay et al.

(10) Patent No.: US 7,545,919 B2
(45) Date of Patent: Jun. 9, 2009

(54) TELEMATIC SYSTEM WITH AN AUTOMATIC RECONNECTION SUPPORT

(75) Inventors: Andras Montvay, Stuttgart (DE); Harald Reiter, Aachen (DE); Josef Lauter, Geilenkirchen (DE); Ralf Schmidt, Aachen (DE); Olaf Such, Aachen (DE); Christian Reichinger, Neutraubling (DE)

(73) Assignee: Koninklijke Philips Electronics N. V., Eindhoven (NL)

( * ) Notice: Subject to any disclaimer, the term of this patent is extended or adjusted under 35 U.S.C. 154(b) by 529 days.

(21) Appl. No.: 10/539,354

(22) PCT Filed: Dec. 10, 2003

(86) PCT No.: PCT/IB03/05848

§ 371 (c)(1),
(2), (4) Date: Jun. 15, 2005

(87) PCT Pub. No.: WO2004/057550

PCT Pub. Date: Jul. 8, 2004

(65) Prior Publication Data

US 2008/0013703 A1     Jan. 17, 2008

(30) Foreign Application Priority Data

Dec. 19, 2002    (EP)   ................................ 02080432

(51) Int. Cl.
*H04M 11/00*     (2006.01)
(52) U.S. Cl. .................................... 379/106.01; 379/45
(58) Field of Classification Search ............ 379/106.01, 379/106.02, 37–40, 45
See application file for complete search history.

(56) References Cited

U.S. PATENT DOCUMENTS

| 4,838,275 A | | 6/1989 | Lee |
|---|---|---|---|
| 5,311,569 A | * | 5/1994 | Brozovich et al. ............ 379/45 |
| 6,004,266 A | | 12/1999 | Clawson |
| 6,176,826 B1 | | 1/2001 | Shimura et al. |

* cited by examiner

*Primary Examiner*—Stella L Woo

(57) ABSTRACT

The system (1) according to the invention is arranged to support an automatic informing of callers (S1, S2, . . . , SN) upon an event of an interrupt in a telecommunication line engaged with a receiving station (4) according to a telecommunication protocol. In order to carry out said automatic informing the receiving station (4) is adapted with a computer program (6,8,10,12,14) arranged to transmit a prerecorded message to all engaged parties upon an event of the interrupt. The computer program is further arranged to carry out background interaction with a caller who is put on hold, so that the caller is not left behind unattended.

11 Claims, 3 Drawing Sheets

TELEMATIC SYSTEM WITH AN AUTOMATIC RECONNECTION SUPPORT

Figure 1:
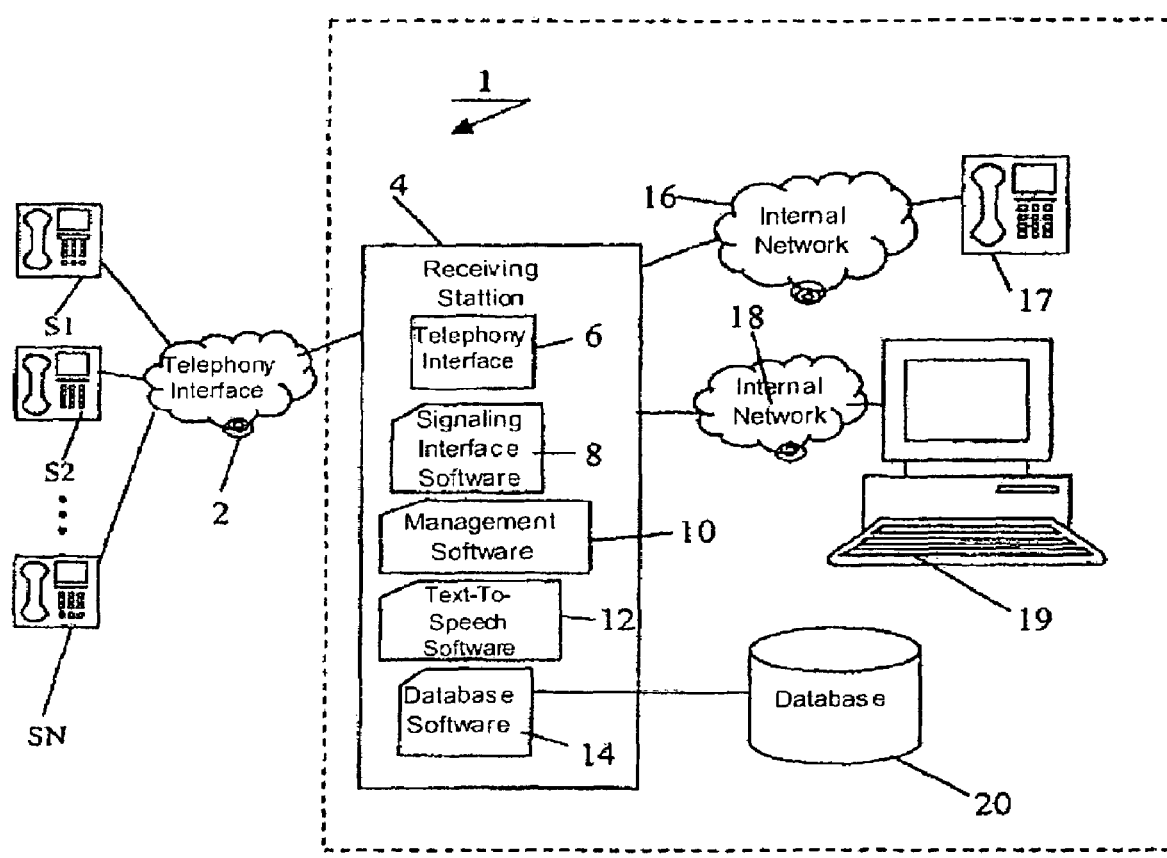

The invention relates to a telematic system arranged for enabling an automatic reconnection support, said system comprising an operator-controlled receiving station arranged to communicate according to a communication protocol with a plurality of remotely arranged calling stations comprising a first calling station and a second calling station, said receiving station being further arranged to enable an interrupt in the communication protocol with the first calling station upon a receipt of an interrupt request from the second calling station in order to establish a connection to the second calling station.

The invention further relates to a method of enabling an automatic reconnection support to an operator-controlled receiving station by means of a telematic system, said receiving station being arranged to communicate to a plurality of remotely arranged calling stations according to a communication protocol, said receiving station being further arranged to enable an interrupt in the communication with a first calling station upon an receipt of a interrupt request from a second calling station.

A telematic system as set forth in the opening paragraph is known from U.S. Pat. No. 6,176,826. The known telematic system is arranged as a part of a home care system for purposes of medical assistance. The known system is arranged to enable an emergency interrupt in a communication with a first patient in case a second patient sends a distress signal, for example by means of an urgency code. The known system operates as follows: in case the distress signal is received by the receiving station, the operator of the receiving station is informed about an urgency level of the distress. In case the urgency level has a high value, the operator interrupts the communication to the first patient in order to establish a communication to the second patient.

A disadvantage of the known system is that the operator has to inform the party he is engaged with about a coming interrupt in the communication. This procedure costs time and attention of the operator thus reduces the efficiency of the response of the system as a whole. Next to this it is a further disadvantage of the known system that the user who is put on hold does not receive any further feedback from the system.

It is an object of the invention to provide a telematic system where an information about an interrupt in the communication is transmitted to relevant parties in a fast and reliable way.

For this purpose the telematic system according to the invention is characterized in that the receiving station comprises informing means arranged to support an automatic transmission of a message to the first calling station, to the second calling station and to an operator upon an event of enabling the interrupt in the communication protocol, the receiving station comprising a computer program arranged to control said informing means. According to the technical measure of the invention the receiving station is equipped with a suitable computer program, said computer program being arranged to interface to the remote station being engaged with the receiving station by means of the communication protocol, further referred to as the first calling station and to interface to the remote station transmitting an interrupt request signal, said station further referred to as the second calling station. An example of the informing means is a text-to-speech engine arranged to verbalize a textual output. Upon an event of a receipt of the interrupt signal by the receiving station, the computer program activates the informing means which are arranged to transmit a message to the first calling station. An example of such a message is 'You are now put on hold, please wait'. Another example of a message is a combination of a prerecorded message with personal message, like 'You are now put on hold, Mr. Smith, please wait'. In this case the computer program is arranged to search in an administrative database of the receiving station for the personal data of the caller of the first calling station and to append the prerecorded message with personal information of the caller, for example his name. The computer program included in the system according to the invention is further arranged to inform the operator of the receiving station that the switching between the first calling station and the second calling station is about to take place so that the operator does not need to lose time for preparatory interrogation about who is on the line. The computer program is also arranged to transmit a message to the second calling station, like 'You interrupt request is acknowledged', so that the caller can immediately engage in conversation with the operator. It must be noted that the communication protocol must be understood in a broad sense, comprising data exchange, as well as uploading and downloading of data.

An embodiment of the telematic system according to the invention is characterized in that the computer program is arranged to carry-out a background interaction with the first calling station upon an event of the receiving station being connected to the second calling station. It is preferable that the person of the first calling station is not left behind unattended. In some situations it is even not necessary that the operator of the receiving station be on the line with the caller all the time. For example, in case of a medical emergency when the operator is communicating to an ambulance dispatch center, the informing means are controlled by the computer program to replay a message 'The ambulance is being dispatched'. According to this technical measure the caller is informed about the procedures taking place on the other end, even when he is put on hold.

A further embodiment of the system is characterized in that the informing means are further arranged to transmit workflow instructions to an operator of the receiving station. In cases the receiving station is arranged to deal with clients of different kind, it is desirable that the operator is backuped on the procedural steps by the informing means. This technical measure is particularly suitable for cases of acute emergency, like heart attack. For example, in case the caller of the first calling station is a bystander witnessing an acute medical emergency, the operator can be given appropriate information upon the individual suffering from the emergency, like relevant medical data, preferred contact telephone numbers, as well as necessary information about closest ambulance dispatch center, name and address of the general practitioner, etc. The operator is then assisted in his response steps to ensure optimal response to the acute emergency. The typical steps of possible response scenarios can be stored as saved textual templates in a database of a computer of the receiving station. These templates are then addressed by the computer program, which is arranged to select an appropriate template, for example according to a textual tag. Preferably, the computer program is arranged to analyze the interrupt request signal. For example, it is possible to prescribe a selected pool of calling stations to typical clients, like emergencies of a selected type. When one of the calling stations belonging to such a pool initiates an trigger request signal, the computer program addresses a corresponding workflow template. Alternatively, in case the system is equipped with signaling means operating using a voice recognition engine, the textual input can be searched in order to find key words, like fire, burglary, health condition, etc. The operator of the receiving station answering to such an interrupt request is then backuped with a corresponding workflow template. It is also possible to arrange the computer program to personalize the template within one selected emergency case and to provide such personalized template to the operator. For example, when the operator is dealing with two cases of a similar type the computer program can fill in the blanks in the template with personal information of the caller stored in the database. In this way the operator will not be confused between two cases of similar type.

A still further embodiment of the system according to the invention is characterized in that the receiving station further comprises signaling means arranged to scan available communication channels of the remotely arranged calling stations in order to detect the interrupt request signal. It is possible that in a situation of a distress the caller cannot appropriately transmit an interrupt request to the receiving station, when put on hold. Therefore, it is preferable that the receiving station is arranged to scan the available communication channels for a possible interrupt request. Preferably, the receiving station is adapted with signaling means arranged to carry out said scanning. Preferably, the signaling means are adapted with a voice recognition engine, which is arranged to translate predetermined words and expressions into the interrupt request. For example, the word 'Help' can be assigned the interrupt request status. Alternatively, voice frequency, hardness, repetition rate can be used by the signaling means to assign the interrupt request. Additionally, the signaling means can be arranged with a clock, which triggers the interrupt request automatically upon an elapse of a predetermined time period, for example 1 minute. This feature is particularly practical in cases of acute medical emergency, where active interaction with the caller is required.

A still further embodiment of the system according to the invention is characterized in that the receiving station is equipped with a user interface arranged to echo statuses of engaged calling stations to the operator of the receiving station. It is preferable that the operator engaged with a plurality of calling stations and dealing with several tasks is informed upon the steps carried out in real time. For example, the user interface can be arranged to echo the following events: a dispatch of an ambulance, informing the general practitioner, informing relatives and/or neighbors, etc. Preferably, this information is displayed on a display screen for convenience of the operator, so that the operator is kept updated on the processes taking place on other ends.

These and other aspect of the invention will be further discussed with reference to figures.

FIG. 1 presents in a schematic way an embodiment of a telematic system according to the invention.

Figure 2:
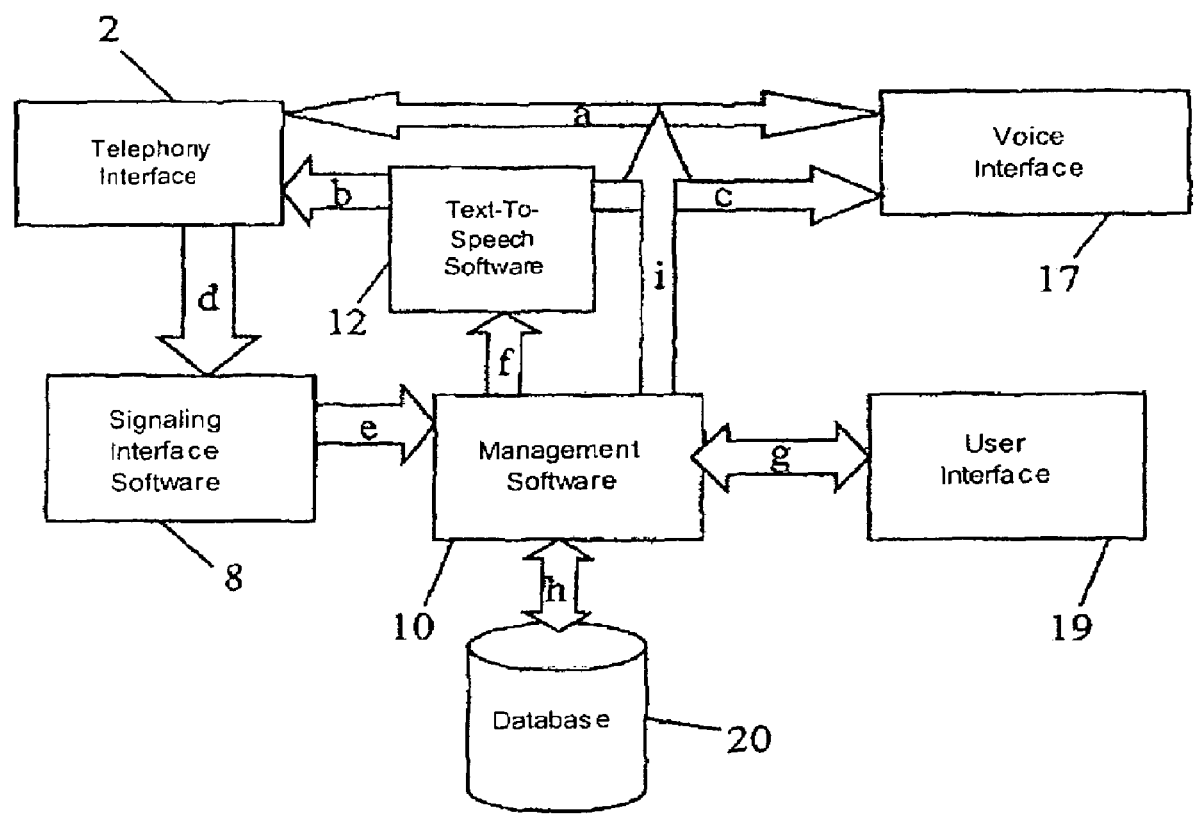

FIG. 2 presents in a schematic way an embodiment of a flowchart of tasks carried out by the computer program according to the invention.

Figure 3:
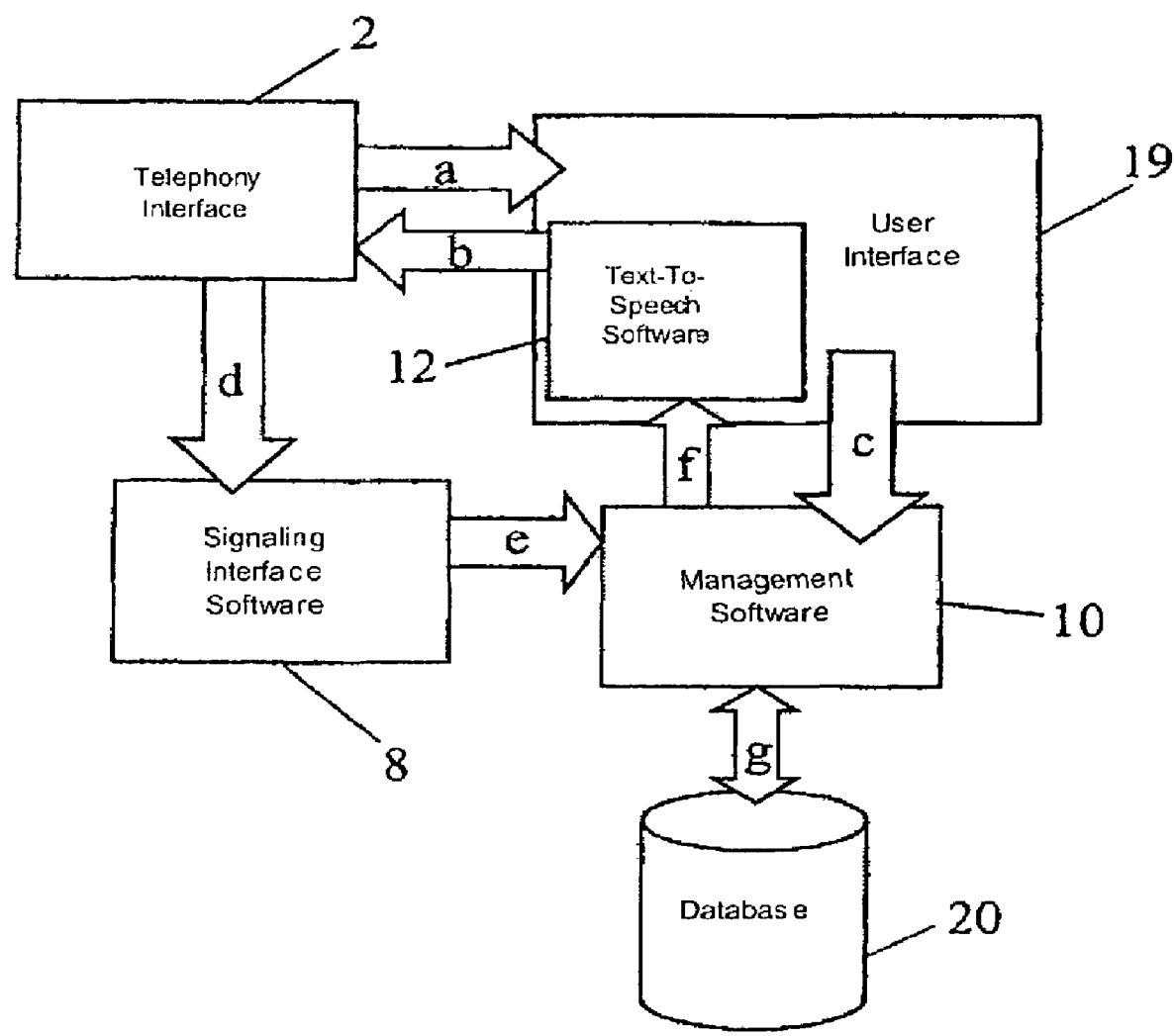

FIG. 3 presents in a schematic was an embodiment of a flowchart of background tasks carried out by the computer program according to the invention.

FIG. 1 presents in a schematic way an embodiment of a telematic system according to the invention. The telematic system 1 is arranged to communicate with a plurality of remote calling stations S1, S2 . . . SN by means of telephony interface 2. The telematic system 1 comprises a server 4 connected via internal telephone system 16 to a voice interface 17 to the operator of the receiving station. The server 4 is arranged to carry out the steps of the computer program comprising the following subroutines: signaling interface software 8, management software 10, database software 14, text-to-speech software 12. The signaling interface software 8 is arranged to scan the telephony interface 6 in order to detect an incoming interrupt request signal from any of the remotely arranged calling stations S1, . . . , SN.

The system 1 can run on a standard Windows PC in a Computer Telephony Integration (CTI) environment. The management software 10 can then be integrated into a CTI application, e.g. one developed with Envox Studio or a similar CTI application creation tool. Preferably, the CTI application is responsible for connecting an incoming call to the operator my means of internal network 16 and voice interface 17, retrieving the caller's personal data from a database 20 and displaying this data as well as workflow instructions to the operator on a user interface 19. The signaling interface software 8 can also be an integral part of the CTI application, as functionality like DTMF or voice recognition can typically well be integrated here. Adding the signaling interface software 8 implicates that instead of playing a waiting message, the channel is connected to a voice recognition engine (not shown), and that when this engine successfully recognizes a word like "hello" or "help", the signaling software running on this channel sends an interrupt request signal to the operator's user interface, in order to display the reconnection request to the agent.

The telephony interface 6 in this embodiment can be a standard telephony interface extension card, e.g. to be connected to the PCI bus, which can be accessed using standard Windows device drivers following the TAPI (Telephone API) standard. It can be an ISDN or an analogue card. The voice interface to the operator normally consists of a so-called station interface card, where normal phones can directly be connected to the PC. Alternatively, it can be interesting for smaller systems to just connect a phone to an extension of an already present internal telephone system, and use one of the normal telephony channels of the telephony interface card to connect to this phone.

The graphical user interface 19 to the operator can be generated by an extension to the CTI application directly on the PC running this application. This is feasible for a system with only one operator. In a larger system or for reasons of geographic separation of a (regularly serviced) server PC and the agent's workplace, the GUI can instead be on a separate PC, to which the CTI application connect over an IP socket or any other type of standard PC networking connection supported by the CTI application creation tool used. The database 20 will typically be accessed over the ODBC interface (not shown) supported by all relevant database implementations on PCs, using SQL statements to retrieve record sets.

Alternatively, the signaling interface software 8 can be integrated on a standard telephony interface card as described above. It could consist of a dedicated chip "listening in" on all lines of the card, and setting flag values for all lines indicating whether someone is signaling on that line or not. These flag values could then be retrieved by the management software 10 using a special API, or there could be an API to indicate which channels to listen on, where the signaling interface chip generates an event callback whenever one of those lines send a reconnection request. This type of implementation will not use a complete voice recognition engine for detection, as that would be costly and duplicating resources that are available in software on any standard PC. Instead, simpler methods like DTMF detection or just detection of any textual input on this line would be used. This functionality could be integrated into one of the existing processors on the telephony interface card for even further cost reduction.

FIG. 2 presents in a schematic way an embodiment of a flowchart of tasks carried out by the computer program of the system according to the invention. The operation of the system will be explained using an example comprising a medical alarm case. The management software 10 retrieves all necessary information (like relatives' names etc.) for all alarm cases from the database 20. Based on this information and the state of the system (who is connected to whom), it generates the GUI 19 for the operator (e.g. containing the "now connecting to Ms. Jones" messages) as well as instructions to the text-to-speech (TTS) engine 12. The TTS engine 12 generates spoken voice messages to external parties (bystander, emergency medical center, etc. over the telephony interface) as well as to the operator (over the voice interface 17 to the operator). The management software 10 also handles the connections between the telephony interface 2 and the voice interface 17 (i.e. putting people through or on hold). The signaling interface 8 listens in on all the lines on the telephony interface, and finds the interrupt request signals on these lines. For this purpose, it can contain elements like a DTMF receiver, voice recognition or any other suitable recognizer for e.g. a signaling tone generated by an alarm button. It will then send an event to the management software 10 indicating the reconnection request.

In an example scenario, let us assume that there are two current alarm cases and one operator is handling both. The agent is currently speaking to the neighbor of patient A, which means the telephony interface 2 forms a connection from the line "neighbor A" (not shown) to the voice interface 17 to operator (arrow a), and has the lines "home station A", "home station B" and "EMS B" connected to the signaling interface (arrow d) and the TTS engine (arrow b). The TTS engine is generating informative audio prompts on each of these lines, specifically it is just about to provide the address etc. of patient B to the "EMS B" line. The GUI 19 shows all relevant data about patient A and his neighbor to the operator, as well as workflow instructions considering how to cope with a particular emergency in an optimal way. The workflow instructions can be uploaded from the database 20 according to the type of the actual alarm case.

Assuming the bystander at home B experiences difficulties with coping with a particular emergency, the voice recognition means (not shown) from the signaling interface 8 detect a predetermined word, like "help" and assigns an interrupt request to the calling station of B and forwards it to the management software 10. These steps are schematically indicated by arrows d and e. The management software 10 addresses the workflow template (not shown) of this alarm case and instructs the operator accordingly, for example by reconnecting the calling station B to the operator. The reconnection is performed as follows: The management software 10 instructs the actual re-routing of lines (i), such that home station B is now connected to the agent (a), while neighbor A is now connected to TTS and signaling interface (b,d). The management software 10 instructs the TTS (f) to give appropriate voice prompts to all lines (b,c) and instructs the GUI (g) to show all relevant information about the case B to the operator.

The operator greets bystander B with the words "Ms. Jones, I see you need some assistance". At the same time, the TTS engine says the following to neighbor A "Dear Ms. Miller, you have been disconnected from our agent Mr. Brown because a dramatic change in another alarm case required immediate attention. As Mr. Brown just told you, please get the keys to Ms. Floyd's apartment and go over to open the door to the paramedics who will arrive any minute. Thank you very much."

FIG. 3 presents in a schematic way an embodiment of a flowchart of background tasks carried out by the computer program of the system according to the invention. The required feedback loop to enable a background support for a user kept on hold is realized by means of the user interface 19.

Over this interface, which can preferably be implemented as a DTMF or a voice recognition, the caller can e.g. answer questions formulated over the text-to-speech engine (arrows b,f) generated by the management software 10. The management software 10 gathers such answers and uses a background information uploaded from the database (arrow g) to enable next steps within the background task. At the same time, the management software uses information from the signaling interface 8 (arrows d,e) and the database (arrow g) to decide about actual switching of communication lines (not shown).

The invention claimed is:

1. A telematic system (1) arranged for enabling an automatic reconnection support, said system comprising an operator-controlled receiving station (4) arranged to communicate according to a communication protocol with a plurality of remotely arranged calling stations (S1, S2, SN) comprising a first calling station (S1) and a second calling station (S2), said receiving station being further arranged to automatically enable an interrupt in the communication protocol with the first calling station upon a receipt of an interrupt request from the second calling station in order to establish a connection to the second calling station, characterized in that the receiving station comprises informing means (12) arranged to support an automatic transmission of a message to the first calling station, to the second calling station and to an operator upon an event of enabling the interrupt in the communication protocol, the receiving station comprising a computer program (6, 8, 10, 12) arranged to control said informing means and said interrupt.

2. A system according to claim 1, characterized in that the computer program (6, 10. 12, 14) is arranged to carry-out a background interaction with the first calling station (S1) upon an event of the receiving station being connected to the second calling station (S2).

3. A system according to claim 1, characterized in that the message is selectable from a plurality of messages stored in a database (20), each message of said plurality of messages corresponding to a separate interrupt event.

4. A system according to claim 1, characterized in that the informing means (12) is further arranged to transmit workflow instructions to the operator of the receiving station.

5. A system according to claim 1, characterized in that the receiving station further comprises signaling means (8) arranged to scan available communication channels of the remotely arranged calling stations in order to detect the interrupt request signal.

6. A system according to claim 5, characterized in that the signaling means is further arranged to assign an urgency code to a detected interrupt request signal, the computer program being further arranged to process said interrupt request according to the assigned urgency code.

7. A system according to claim 5, characterized in that the signaling means comprise a voice recognition engine adapted to detect the interrupt request signal from a textual output of the communication channel.

8. A system according to claim 5, characterized in that the signaling means comprise a DTMF receiver arranged to detect an electrical trigger signal corresponding to the interrupt request signal on the communication channel.

9. A system according to claim 1, characterized in that the receiving station is equipped with a user interface (17,19) arranged to echo statuses of engaged remote calling stations to the operator of the receiving station.

10. A method of enabling an automatic reconnection support to an operator-controlled receiving station by means of a telematic system (1), said receiving station being arranged to communicate to a plurality of remotely arranged calling stations (S1,S2,SN) according to a communication protocol, said receiving station being further arranged to automatically enable an interrupt in the communication with a first calling station upon an receipt of an interrupt request from a second calling station, said method comprising the steps of: acknowledging the interrupt request from the second calling station, transmitting a first message to the first calling station in an automatic mode, transmitting a second message to the second calling station in an automatic mode, informing an operator about an interrupt in the communication to the first calling station, automatically interrupting the communication to the first calling station, and establishing a telematic connection to the second calling station.

11. A method according to claim 10 characterized in that said method further comprises the steps of recognizing a case from the interrupt request, selecting workflow instructions corresponding to said case from a prestored database of cases, and transmitting the workflow instructions corresponding to the recognized case to the operator.

* * * * *